United States Patent [19]

Sakakibara et al.

[11] Patent Number: 4,711,213
[45] Date of Patent: Dec. 8, 1987

[54] KNOCK CONTROL SYSTEM FOR INTERNAL COMBUSTION ENGINES

[75] Inventors: Koji Sakakibara, Hekinan; Hiroshi Haraguchi, Kariya, both of Japan

[73] Assignee: Nippondenso Co., Ltd., Kariya, Japan

[21] Appl. No.: 850,164

[22] Filed: Apr. 10, 1986

[30] Foreign Application Priority Data

Apr. 11, 1985 [JP] Japan ................... 60-77066

[51] Int. Cl.$^4$ .............................................. F02P 5/04
[52] U.S. Cl. ................................................. 123/425
[58] Field of Search ................ 123/425, 435, 416, 417

[56] References Cited

U.S. PATENT DOCUMENTS

| 4,513,716 | 4/1985 | Haraguchi | 123/425 |
| 4,607,602 | 8/1986 | Komurasaki | 123/425 |
| 4,610,232 | 9/1986 | Iwata | 123/425 |

Primary Examiner—Ronald B. Cox
Attorney, Agent, or Firm—Cushman, Darby & Cushman

[57] ABSTRACT

A knock control system for an internal combustion engine has a knock discrimination level. If an output signal from a knock sensor is higher than the knock discrimination level, then the knock control system determines that the engine is subjected to knock and retards the ignition timing. If the knock sensor output signal is lower than the knock discrimination level, i.e., if no knock or detonation is detected over a prescribed period of time, then the ignition timing is advanced. The knock discrimination level is corrected such that a probability that the maximum value of the knock sensor output signal will exceed the knock discrimination level is greater in a knock control range than outside of a knock control range.

13 Claims, 8 Drawing Figures

KNOCK CONTROL SYSTEM FOR INTERNAL COMBUSTION ENGINES

BACKGROUND OF THE INVENTION

The present invention relates to a knock control system for controlling a knock controlling factor such as an ignition timing, a boost pressure, an air-fuel ratio, an amount of exhaust gas sent back in an EGR system, or the like in accordance with the condition in which a knock is produced in an internal combustion engine.

Knock control systems generally include a knock sensor for detecting vibration of an internal combustion engine. If an electric signal produced by the knock sensor is in excess of a certain level (hereinafter referred to as a "knock discrimination level"), then the knock control system determines that the engine is subjected to knock and retards the ignition timing. Conversely, if the electric signal from the knock sensor is below the knock discrimination level, i.e., if no knock or detonation is detected over a prescribed period of time, then the ignition timing is advanced. In this manner, the knock control system controls the ignition timing to be kept close to a critical point beyond which knock would be produced, thereby improving the fuel economy and power output capability of the engine. See Japanese Laid-Open Patent Publication Nos. 51-46606 published on Apr. 21, 1976, 56-115861 published on Sept. 11, 1981, and 58-180766 published on Oct. 22, 1983, for example, for conventional knock control systems.

The knock discrimination level is of great importance in the proper operation of the knock control system. If the knock discrimination level were too high, knock that is actually produced would not be detected and the ignition timing or spark would be advanced. As a result, the engine would knock many times and lead to damage. If the knock discrimination level were too low, the spark would be retarded regardless of the fact that no knocking occurs, preventing the engine from generating enough power output.

It has been conventional practice to establish an appropriate knock discrimination level as by applying the knock sensor signal to an integrating circuit, multiplying the output signal from the integrating circuit by a constant K (hereinafter referred to as a "K value") closely commensurate with the engine speed, and adding an offset voltage to the product.

However, since engine blocks or other engine components are susceptible to different manufacturing errors from engine to engine even if the engines are of the same design, the knock discrimination levels of some engines may not be appropriate and no accurate knocking may be detected regardless of a closely matched K value.

Therefore, establishing the knock discrimination level for the prior knock control systems has required the close matching of a K value, and has been disadvantageous in that accurate knocking detection is rendered impossible by engine manufacturing errors.

SUMMARY OF THE INVENTION

In view of the aforesaid drawbacks of the conventional knock control system, it is an object of the present invention to provide a knock control system which requires no close matching of a K value and is capable of accurately detecting knock regardless of engine manufacturing errors by automatically correcting a knock discrimination level.

The automatic correction of the knock discrimination level is based on the experimental fact, found by the inventors, that a distribution pattern of the accumulated logarithmic values LOG(V) of maximum peak values V of knock sensor output signals is observable.

Figure 1:
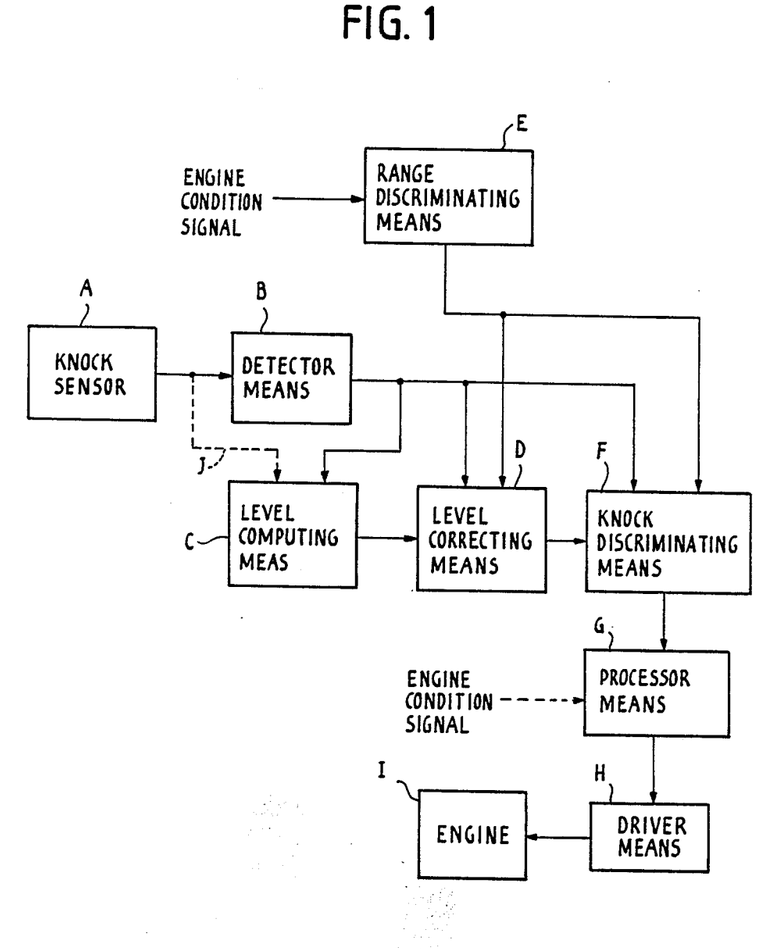
FIG. 1 is a block diagram of a knock control system according to the present invention, represented as a combination of functional blocks.

According to the present invention, as shown in FIG. 1 of the accompanying drawings, a knock control system for use with an internal combustion engine I, comprises a knock sensor A for detecting knock produced by the internal combustion engine, knock discriminating means F for discriminating knock based on an output signal from the knock sensor, processor means G responsive to the result of knock discrimination for computing a control value to control a knock control factor for the internal combustion engine, driver means H responsive to the control value for varying the knock control factor, detector means B for detecting the maximum value of the output signal from the knock sensor during a prescribed period of time, level computing means C for computing a knock discrimination level to be compared with the maximum value, range discriminating means E for ascertaining whether the operating condition of the internal combustion engine is in or outside of a knock control range in which knock is substantially produced, and level correcting means D for correcting the knock discrimination level such that a probability that the maximum value of the output signal from the knock sensor will exceed the knock discrimination level is greater in the knock control range than outside of the knock control range. When the operating condition of the internal combustion engine is in the knock control range, the engine may be subjected to a medium or high load, and when the operating condition is outside of the knock control range, the engine may be subjected to a low load.

Since the knock discrimination level is established such that a probability that the maximum value of the knock sensor output signal will exceed the knock discrimination level is greater in the knock control range than outside of the knock control range, no close matching of the value K is required, and the engine can be controlled in a stable condition in which the engine slighly knocks.

BRIEF DESCRIPTION OF THE DRAWINGS

The present invention will be described in detail by way of an illustrative example with reference to the accompanying drawings, in which.

DETAILED DESCRIPTION

Prior to describing the specific arrangement of a knock control system according to the present invention, the experimental fact which has been found by the inventors and forms a basis of the present invention will first be described below.

Figure 2:
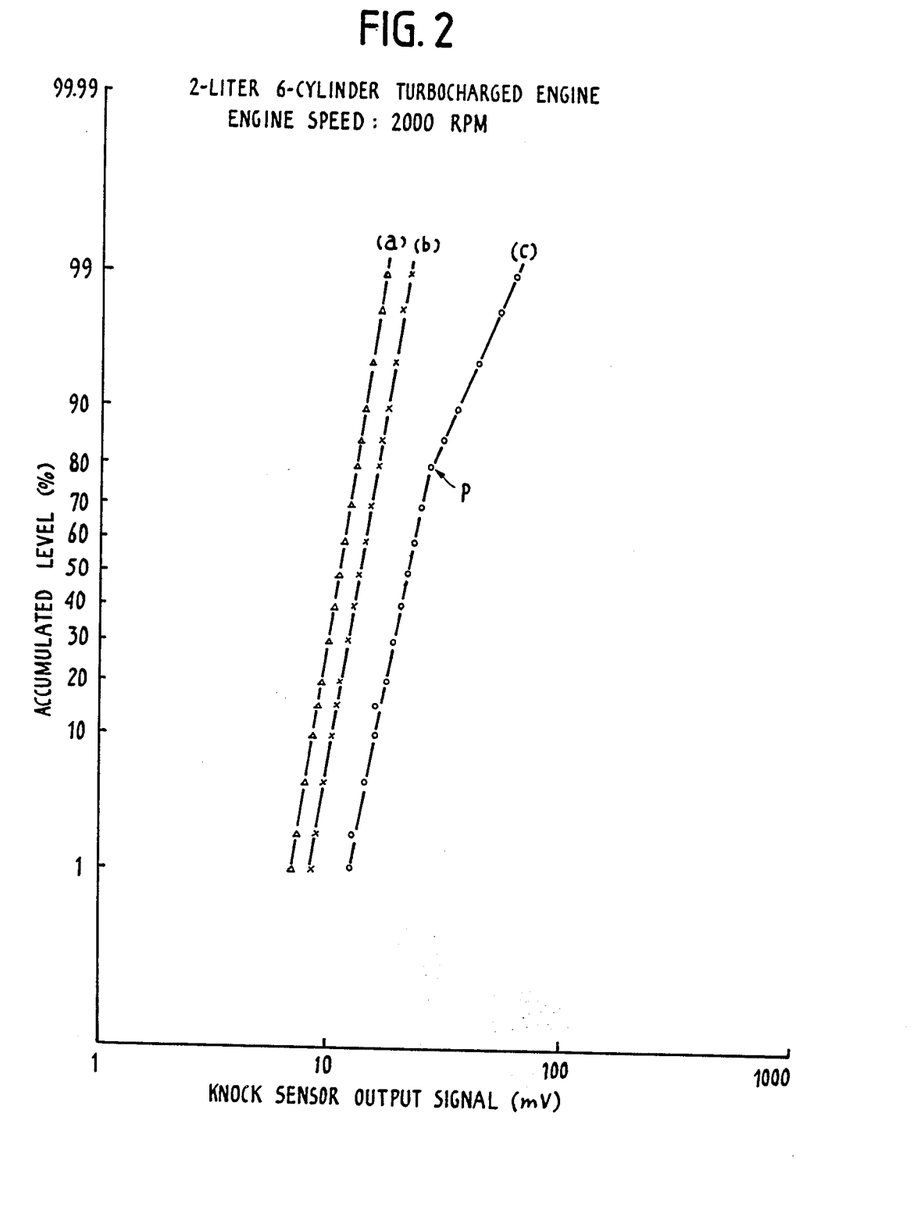
FIG. 2 is a graph showing distribution patterns of the accumulated logarithmic values of maximum values V of knock sensor output signals.

FIG. 2 shows distribution patterns, plotted on a logarithmic normal probability sheet, of many sampled output values V produced by passing knock sensor output signals through a bandpass filter with a transmission band ranging from 7 to 8 kHz under certain engine conditions, and holding the peaks or maximum values of output signals from the bandpass filter during the combustion stroke of one engine cylinder. The distribution pattern (a) in FIG. 2 is obtained under a low engine load by sampling the output values outside of a knock control range, i.e., when substantially no knock is supposed to occur. No knock is caused according to the distribution pattern (a). The distribution pattern (b) is obtained under a medium engine load by sampling the output values in the knock control range in which knock could be produced. However, no knock occurs according to the distribution pattern (b). The distribution pattern (c) is plotted when knock is acutally generated in the knock control range. The distribution patterns (a) and (b) are drawn respectively as straight lines on the logarithmic normal probability sheet, whereas the distribution pattern (c) is represented by a line comprising two straight line segments inclined at different angles on both sides of a point P. The inventors have found that the bent shape of the distribution pattern (c) is indicative of the occurrence of knock. The gradient of the straight line segment of the distribution pattern (c) which is leftward of the point P remains substantially the same as those of the distribution patterns (a) and (b). This means that the gradients of the distribution patterns of the output values V are substantially independent of the engine load. The aforesaid experimental fact can explain that knock control can be performed to cause the engine to knock slightly by establishing a knock discrimination level such that a probability that the maximum value V of a knock sensor signal during a prescribed period exceeds a knock discrimination level Vref is slightly smaller outside of the knock control range than in the knock control range.

For example, the knock discrimination level Vref is determined as Vref=K×V$_{50}$ where K is a constant (K value) and V$_{50}$ is the central value of a distribution of maximum values V. Knock control is assumed to retard the ignition timing or spark by ΔR when knock is discriminated once and to advance the ignition timing by ΔR when there is no knock discriminated during a given period T$_1$. If there is no limitation on the ignition timing and the speed of rotation of the engine remains the same, knock is always discriminated at a constant probability that depends on the engine rotation speed, the constant probability being 10% for example.

When knock is discriminated outside of the knock control range, i.e., V>Vref, the K value is reduced by ΔK, and when there is no knock discriminated during a given period T$_2$ the K value is increased by ΔK. By setting T$_2$=2×T$_1$, knock is discriminated by the knock discrimination level Vref=K×V$_{50}$ at a probability of 5% insofar as the engine rotation speed remains the same. At this time, the ignition timing is not retarded.

Stated otherwise, the K value is reset so that knock will be discriminated at the probability of 5%.

In the knock control range, knock is discriminated by using the K value which is reset. Where the ignition timing is on a retarded side of the critical knocking point, and no knock occurs, the distribution pattern of V is as indicated by the pattern of FIG. 2(b), and the probability that knock is discriminated is the same as that outside of the knock discrimination range. However, since the ignition timing is controlled in the knock control range so that knock is discriminated at the probability of 10%, the ignition timing is advanced.

Where the ignition timing is on an advanced side of the critical knocking point, the distribution pattern of V is as indicated by the pattern of FIG. 2(c), and knock is discriminated at the probability of 10% or more. Thus, the ignition timing is retarded.

As described above, the ignition timing is stabilized in the condition in which the distribution pattern of V is slightly bent, i.e., knock is slightly produced, by establishing a knock distribution level such that a probability that the maximum value V of a knock sensor signal during a prescribed period exceeds a knock discrimination level Vref is larger in the knock control range than outside of the knock control range.

Figure 3:
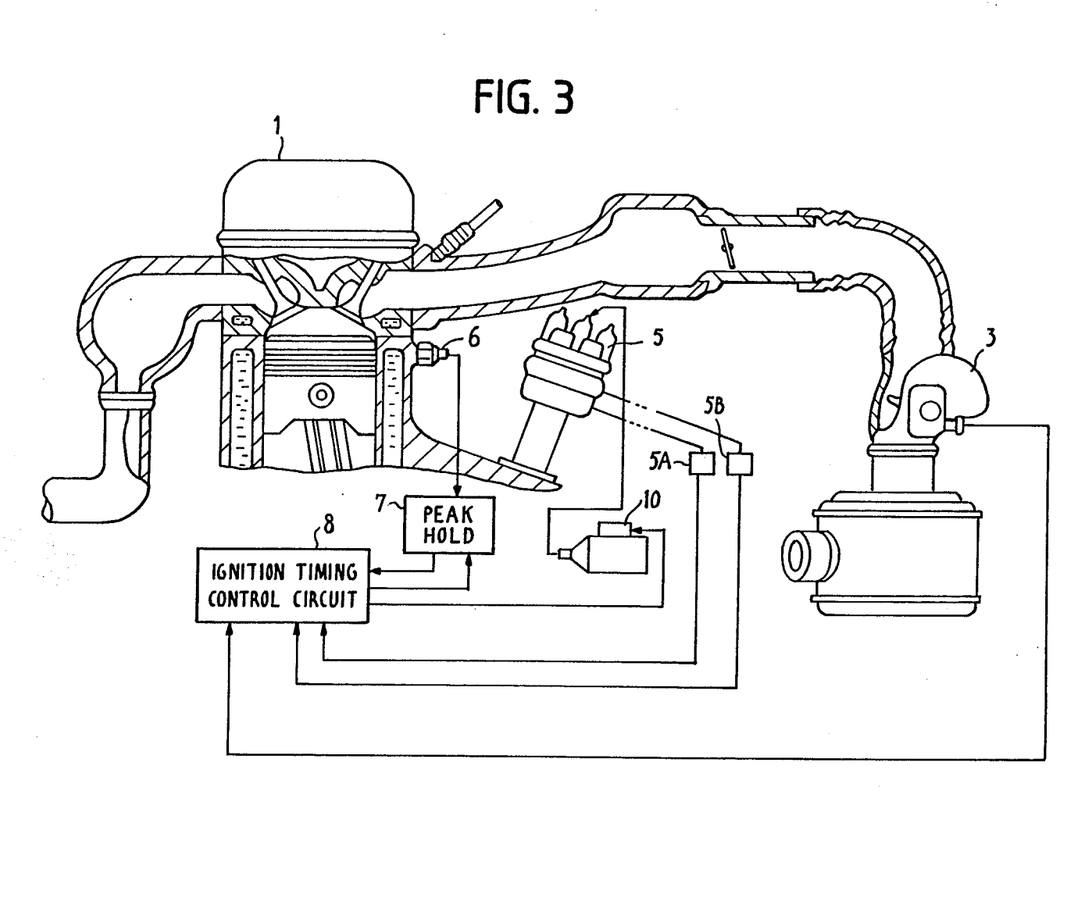
FIG. 3 is a fragmentary cross-sectional view of an internal combustion engine combined with the knock control system of the present invention.

FIG. 3 shows in cross section an internal combustion engine combined with a knock control system according to the present invention. The internal combustion engine, which is of a four-cylinder four-stroke design, is designated at 1, and is connected to an air intake system including an air flowmeter 3 for detecting the rate of air flow supplied to the engine 1. A distributor 5 has a reference angle sensor 5A for detecting a reference crank angle position (such as the top dead center) of the engine, and a crank angle detector 5B for generating an output signal each time the engine rotates through a certain crank angle. A knock sensor 6 mounted on the engine cylinder block is of a piezoelectric or electromagnetic arrangement for detecting knock-induced vibration of the engine cylinder block. The knock sensor 6 is electrically connected to a peak hold circuit arrangement 7 which holds the peak or maximum value of an output signal from the knock sensor 7.

An ignition timing control circuit 8 is responsive to the output signals from the sensors 5A, 5B, the knock sensor 6, and the air flowmeter 3 for controlling the ignition timing of the engine 1. An igniter 10 is responsive to an ignition timing control signal from the ignition timing control circuit 8 for energizing and de-energizing an ignition coil connected to the igniter 10. A high voltage generated by the ignition coil is applied through the center terminal and rotor in the distributor 5 to the spark plugs in engine cylinders to produce sparks at appropriate times.

Figure 4:
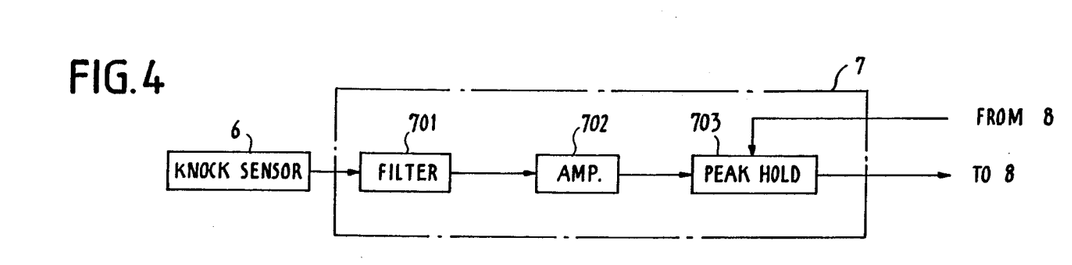
FIG. 4 is a block diagram of a knock sensor and a peak hold circuit arrangement.

The peak hold circuit arrangement 7 is shown in detail in FIG. 4. The peak hold circuit arrangement 7 includes a filter 701 such as a bandpass or high-pass filter for selecting a knock-frequency signal component from the output signal of the knock sensor 6, an amplifier 702 for amplifying the signal from the filter 701, and a peak hold circuit 703 including a capacitor for holding the peak or maximum value of the amplified knock sensor signal from the amplifier 702 in response to a signal from the ignition timing control circuit 8.

Figure 5:
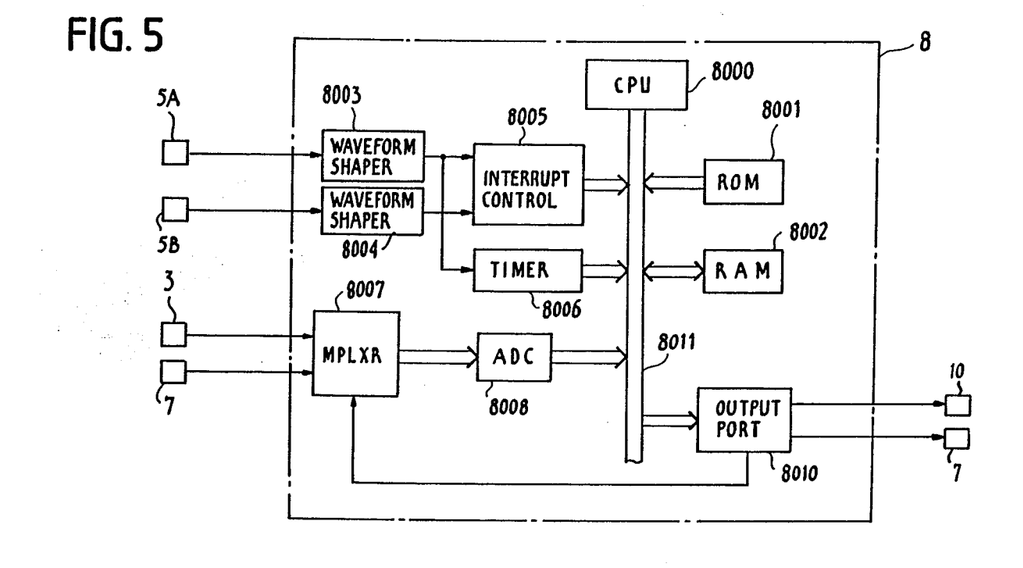
FIG. 5 is a block diagram of a control circuit in the knock control system.

Detailed arrangement and operation of the ignition timing control circuit 8 will be described with reference to FIG. 5. The ignition timing control circuit 8 has a central processing unit (CPU) 8000 comprising an 8-bit microprocessor for computing an ignition timing, a read-only memory (ROM) 8001 for storing a control program and control constants required for arithmetic operations, a random-access memory (RAM) 8002 for temporarily storing computed data items while the CPU 8000 is being operated under the control program, and waveform shapers 8003, 8004 for shaping the waveforms of the output signals from the sensors 5A, 5B.

The ignition timing control circuit 8 also includes an interrupt control unit 8005 for enabling the CPU 8000 to effect an interrupt process, and a 16-bit timer 1006 in which its count is incremented by one in each clock period which is the basic period of operation of the CPU 8000. The timer 8006 and the interrupt control unit 8005 jointly serve to detect the speed of rotation of the engine and the crank angle position in the following manner: Each time an interrupt is generated by the output signal from the reference crank angle sensor 5A, the CPU 8000 reads the count from the timer 8006. Since the timer count is incremented in each clock period (1 microsecond, for example), the time interval between two successive reference crank angle signals, i.e., the time required for the engine to make one revolution, can be measured by computing the difference between the timer count in the present interrupt cycle and the timer count in the preceding interrupt cycle. Given the time period in which the engine makes one revolution, the speed of rotation of the engine can be determined. The crank angle position can be known from the output signal from the crank angle sensor 5B, using the top dead center signal from the reference crank angle sensor 5A as the reference crank angle signal, since the output signal from the crank angle sensor 5B is produced each time the engine crankshaft is turned through a constant crank angle (such as 30° CA). Therefore, the crank angle position can be determined as the crank angle in increments of 30° CA, for example. The crank angle signal from the crank angle sensor is used as a reference signal for the generation of an ignition timing control signal.

A multiplexer 8007 delivers a plurality of analog signals on a time-division multiplex basis to an analog-to-digital converter (A/D converter) 8008. The multiplexing timing of the multiplexer 8007 is controlled by a control signal from an output port 8011. In the illustrated embodiment, the multiplexer 8007 is supplied with the output signal from the peak hold circuit arrangement 7 and the air intake rate signal from the air flowmeter 3. The output port 8010 outputs, as digital signals, the ignition timing control signal to the igniter 10, the control signal to the peak hold circuit arrangment 7, and the control signal to the multiplexer 11. The CPU 8000 delivers the control and data signals over a CPU bus 8011 to control the ROM 8001, the RAM 3002, the interrupt control unit 8005, the timer 8006, the A/D converter 8008, and the output port 8010 and also to transmit data to and receive data from these control circuit components.

Figures 6, 7, 8:
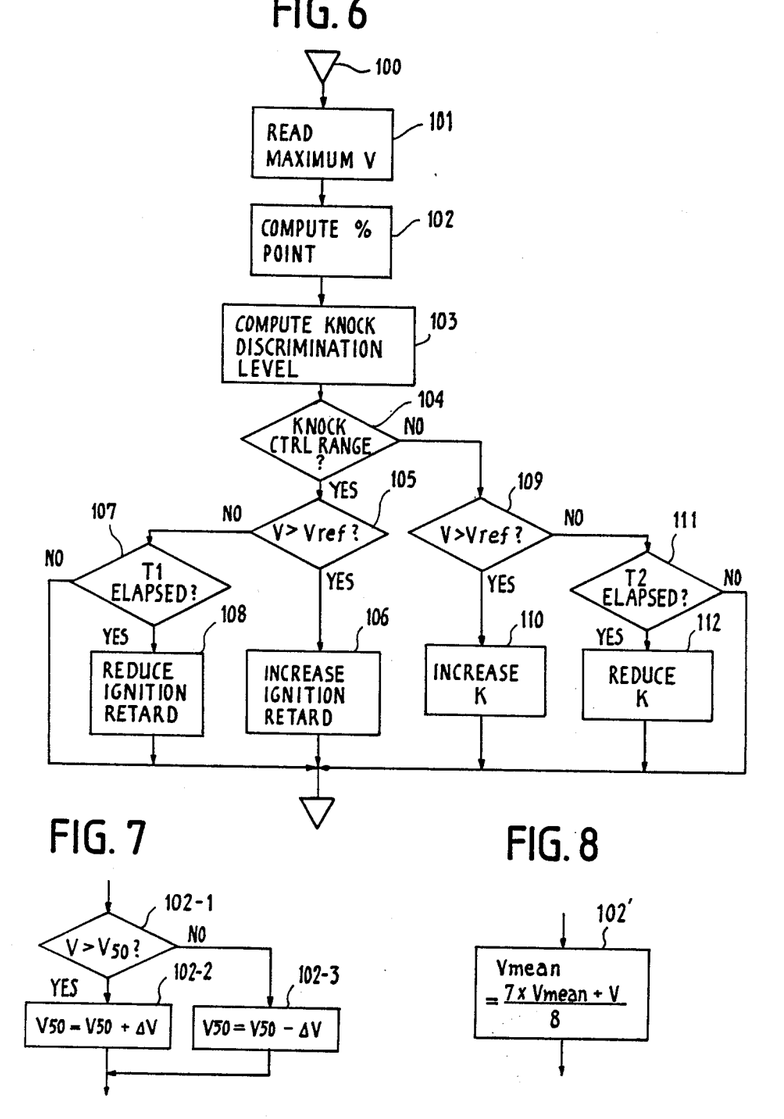
FIG. 6 is a flowchart of successive steps of knock discrimination and correction of a knock discrimination level.
FIG. 7 is a flowchart of detailed operation of a step 102 in the flowchart of FIG. 6.
FIG. 8 is a flowchart of an alternative step for the step 102 in the flowchart of FIG. 6.

Knock discrimination and correction of a knock discrimination level will be described with reference to the flowchart of FIG. 6.

Upon initiation of a knock control routine by an interrupt in a step 100, the peak or maximum value V which is held by the peak hold circuit arrangement 7 is read in a step 101, which is followed by a step 102 in which a certain % point on the distribution pattern of V is computed. The step 102 may be arranged as shown in FIG. 7 in which the value $V_{50}$ at a 50% point on the distribution pattern is computed. More specifically, a step 102-1 ascertains whether the maximum value V which is read at the present time is greater than $V_{50}$ up to the preceding cycle. If $V > V_{50}$, then the program goes to a step 102-2 in which a prescribed value $\Delta V$ is added to $V_{50}$ up to the preceding cycle to produce a new $V_{50}$. If $V \geq V_{50}$ in the step 102-1, then the program goes to a step 102-3 in which the value $\Delta V$ is subtracted from $V_{50}$ up to the preceding cycle to produce a new $V_{50}$. Therefore, $V_{50}$ follows the value (central value) of the 50% point on the distribution pattern of V from time to time. The step 102 may be replaced with a step 102' (FIG. 8) for computing the average Vmean of the values V, because the average of the values V corresponds to the value of a certain % point which is determined by the gradient on the logarithmic normal probability sheet.

The processing goes from the step 102 to a next step 103 which computes a knock discrimination level Vref as $Vref = K \times V_{50}$, for example. Where the average Vmean is determined in the step 102' (FIG. 8), the knock discrimination level Vref is computed as $Vref = K \times Vmean$. Then, a step 104 ascertains whether the engine condition is in the knock control range (for example, medium and high load ranges determined by the engine speed N and the air intake rate Q). If the engine condition is in the knock control range, then the program goes to a step 105 which ascertains whether $V > Vref$. If $V > Vref$, then the CPU determines that knock is produced, and the program proceeds to a step 106 in which the extent to which the ignition timing is retarded is increased by a prescribed value $\Delta R$ in order to suppress knock. If the answer to the decision block 105 is NO, then the program goes to a step 107 which asertains if knock is discriminated for a given period of time $T_1$. If no knock is discriminated, then the program proceeds to a step 108 in which the extent to which the ignition timing is retarded is reduced by $\Delta R$.

If the engine condition is not in the knock control range in the step 104, then the processing goes to a step 109 which ascertains if $V > Vref$ or not. If yes, then the program goes to a step 110 in which the K value is reduced by a prescribed value $\Delta K$. If no in the step 109, then the program goes from the step 109 to a step 111 which ascertains whether the condition $V > Vref$ has been established or not for a given period of time $T_2$. If yes, the program goes to a step 112 in which the K value is increased by $\Delta K$. The time periods $T_1$, $T_2$ are selected such that $T_2 > T_1$.

According to another embodiment, the level computing means C (FIG. 1) may include integrating means for integrating the output signal from the knock sensor A, as indicated by the dotted line J in FIG. 1, and an output signal $V_{BSE}$ from the integrating means may be employed instead of the central value $V_{50}$ or the average Vmean.

In the above embodiments, the ignition timing has been used as a knock control factor. However, a boost pressure of a turbocharged engine, the rate of injected fuel, the air-fuel ratio, the amount of an exhaust gas sent back in an EGR system, or the like may also be used as a knock control factor.

Although certain preferred embodiments of the present invention have been shown and described in detail, it should be understood that various changes and modifications may be made therein without departing from the scope of the appended claims.

We claim:

1. A knock control system for use with an internal combustion engine, comprising:
   a knock sensor for detecting knock produced by the internal combustion engine;
   knock discriminating means for discriminating knock based on an output signal from said knock sensor;
   processor means responsive to the result of knock discrimination for computing a control value to control a knock control factor for the internal combustion engine;
   driver means responsive to said control value for varying said knock control factor;
   detector means for detecting the maximum value of said output signal from said knock sensor during a prescribed period of time;
   level computing means for computing a knock discrimination level to be compared with said maximum value;
   range discriminating means for ascertaining whether the operating condition of the internal combustion engine is in or outside of a knock control range in which knock is substantially produced, and for enabling said processor means to control said knock control factor according to the result of knock discrimination by said knock discriminating means when the operating condition of the internal combustion engine is in said knock control range; and
   level correcting means for correcting said knock discrimination level such that a probability that said maximum value will exceed said knock discrimination level is greater in said knock control range than outside of said knock control range, said knock discriminating means being arranged to discriminate knock in said knock control range according to the knock discrimination level as corrected by said level correcting means.

2. A knock control system according to claim 1, wherein said range discriminating means comprises means for ascertaining whether the operating condition of the internal combustion engine is in or outside of said knock control range based on a load to which the internal combustion engine is subjected.

3. A knock control system according to claim 1, wherein said level computing means comprises means for computing said knock discrimination level by multiplying the central value of a distribution pattern of the maximum values by a predetermined value.

4. A knock control system according to claim 1, wherein said level computing means comprises means for computing said knock discrimination level by multiplying the average of the maximum values by a predetermined value.

5. A knock control system according to claim 1, wherein said level computing means comprises means for computing said knock discrimination level by multiplying the integral of the output signal from said knock sensor by a predetermined value.

6. A knock control system according to claim 3, wherein said level correcting means comprises means for correcting said knock discrimination level by varying said predetermined value.

7. A knock control system for use with an internal combustion engine, comprising:
   a knock sensor for detecting knock produced by the internal combustion engine;
   knock discriminating means for discriminating knock based on an output signal from said knock sensor;
   processor means responsive to the result of knock discrimination for computing a control value to control a knock control factor for the internal combustion engine;
   driver means responsive to said control value for varying said knock control factor;
   detector means for detecting the maximum value of said output signal from said knock sensor during a prescribed period of time;
   level computing means for computing a knock discrimination level to be compared with said maximum value;
   range discriminating means for ascertaining whether the operating condition of the internal combustion engine is in or outside of a knock control range in which knock is substantially produced, and for enabling said processor means to control said knock control factor according to the result of knock discrimination by said knock discriminating means when the operating condition of the internal combustion engine is in said knock control range; and
   level correcting means for increasing said knock discrimination level when the maximum value of the output signal from said knock sensor is greater than said knock discrimination level and for reducing said knock discrimination level when the maximum value of the output signal from said knock sensor is smaller than said knock discrimination level, insofar as the operating condition of the internal combustion engine is outside of said knock control range, said knock discriminating means being arranged to discriminate knock in said knock control range according to the knock discrimination level as corrected by said level correcting means.

8. A knock control system according to claim 7, wherein said level correcting means comprises means for reducing said knock discrimination level when the maximum value of the output signal from said knock sensor remains continuously smaller than said knock discrimination level for a prescribed interval of time.

9. A knock control system according to claim 7, wherein said range discriminating means comprises means for ascertaining whether the operating condition of the internal combustion engine is in or outside of said knock control range based on a load to which the internal combustion engine is subjected.

10. A knock control system according to claim 9, wherein said level computing means comprises means for computing said knock discrimination level by multiplying the central value of a distribution pattern of the maximum values by a predetermined value.

11. A knock control system according to claim 9, wherein said level computing means comprises means for computing said knock discrimination level by multiplying the average of the maximum values by a predetermined value.

12. A knock control system according to claim 9, wherein said level computing means comprises means for computing said knock discrimination level by multiplying the integral of the output signal from said knock sensor by a predetermined value.

13. A method of controlling knock in an internal combustion engine, comprising the steps of:
    detecting knock produced by said internal combustion engine with a knock sensor;

discriminating knock based on an output signal from said knock sensor with a knock discriminating means;

computing a control value to control a knock control factor for said internal combustion engine with processor means responsive to the result of said knock discriminating step;

varying said knock control factor with driver means responsive to said control value;

detecting the maximum value of said output signal from said knock sensor during a predetermined period of time with detector means;

computing a knock discrimination level to be compared with said maximum value with level computing means;

ascertaining whether the operating condition of the internal combustion engine is in or outside of a knock control range in which knock is substantially produced, with range discrimination means;

enabling, with said range discriminating means, said processor means to control said knock control factor according to the result of knock discrimination by said knock discriminating means when the operating condition of the internal combustion engine is in said knock control range;

correcting, with level correcting means, said knock discriminating level such that a probability that said maximum value will exceed said knock discrimination level is greater in said knock control range than outside of said knock control range; and arranging said knock discriminating means to discriminate knock in said knock control range according to the knock discrimination level as corrected in said level correcting step.

* * * * *